(12) United States Patent
Nagarkar et al.

(10) Patent No.: US 11,032,155 B2
(45) Date of Patent: Jun. 8, 2021

(54) NETWORK MAPPING SYSTEM

(71) Applicant: NICIRA, INC., Palo Alto, CA (US)

(72) Inventors: Amardeep Nagarkar, Pune (IN); Shivraj Shahajirao Sonawane, Pune (IN); Shantanu Kulkarni, Pune (IN); Sarat Chandra Annadata, Pune (IN); Sachin Mohan Vaidya, Pune (IN)

(73) Assignee: NICIRA, INC., Palo Alto, CA (US)

( * ) Notice: Subject to any disclaimer, the term of this patent is extended or adjusted under 35 U.S.C. 154(b) by 99 days.

(21) Appl. No.: 16/261,613

(22) Filed: Jan. 30, 2019

(65) Prior Publication Data

US 2020/0169474 A1    May 28, 2020

(30) Foreign Application Priority Data

Nov. 27, 2018   (IN) .............................. 201841044739

(51) Int. Cl.
*H04L 12/24* (2006.01)
*H04L 12/26* (2006.01)

(52) U.S. Cl.
CPC .............. *H04L 41/22* (2013.01); *H04L 41/12* (2013.01); *H04L 43/045* (2013.01)

(58) Field of Classification Search
CPC ........ H04L 41/22; H04L 43/045; H04L 41/12
See application file for complete search history.

(56) References Cited

U.S. PATENT DOCUMENTS

| | | | |
|---|---|---|---|
| 10,324,953 B1* | 6/2019 | Elliott, IV | G06F 16/90335 |
| 10,333,849 B2* | 6/2019 | Masurekar | H04L 43/0888 |
| 2005/0050196 A1 | 3/2005 | Alta et al. | |
| 2007/0204231 A1 | 8/2007 | Cunningham et al. | |
| 2008/0005555 A1 | 1/2008 | Lotem et al. | |
| 2013/0321458 A1* | 12/2013 | Miserendino | H04L 41/22 345/629 |
| 2014/0195666 A1 | 7/2014 | Dumitriu et al. | |
| 2015/0043378 A1* | 2/2015 | Bardgett | H04L 12/4641 370/254 |
| 2016/0359872 A1 | 12/2016 | Yadav et al. | |
| 2017/0052747 A1* | 2/2017 | Cervelli | G06T 19/006 |
| 2017/0104847 A1* | 4/2017 | Zhang | H04L 67/327 |
| 2017/0317954 A1* | 11/2017 | Masurekar | H04L 45/586 |
| 2017/0365093 A1* | 12/2017 | Stacey | G06T 3/4092 |
| 2017/0374174 A1* | 12/2017 | Evens | H04L 67/10 |
| 2018/0063193 A1* | 3/2018 | Chandrashekhar | G06F 9/45533 |
| 2018/0097876 A1* | 4/2018 | Rolia | H04L 67/1046 |
| 2018/0278477 A1 | 9/2018 | Auvenshine et al. | |
| 2018/0309629 A1* | 10/2018 | Mohanram | H04L 41/145 |
| 2018/0324044 A1 | 11/2018 | Owen et al. | |

(Continued)

*Primary Examiner* — Abdullahi E Salad

(74) *Attorney, Agent, or Firm* — Adeli LLP

(57) ABSTRACT

Some embodiments provide a method for generating a multi-layer network map from network configuration data. The method receives network configuration data that defines network components and connections between the network components for a network that spans one or more datacenters. Based on the received network configuration data, the method generates multiple data layers for a multi-layer interactive map of the network. Different data layers include different network components and connections. The method generates a visual representation of the network for each data layer. Each visual representation includes a map of the network at a different level of hierarchy.

20 Claims, 15 Drawing Sheets

(56) References Cited

U.S. PATENT DOCUMENTS

2020/0012505 A1\* 1/2020 Shil .................... H04L 67/10
2020/0169475 A1 5/2020 Nagarkar et al.

\* cited by examiner

NETWORK MAPPING SYSTEM

RELATED APPLICATION

Benefit is claimed under 35 U.S.C. 119(a)-(d) to Foreign Application Serial No. 201841044739 filed in India entitled "NETWORK MAPPING SYSTEM", on Nov. 27, 2018, by NICIRA, INC., which is herein incorporated in its entirety by reference for all purposes.

BACKGROUND

Network virtualization plays a crucial role in the operation of datacenters. These virtual (logical) networks often include many layers of abstractions. Tracing an error or ensuring optimum network performance often involves reviewing information from multiple levels of abstractions of the network. Current network visualization tools are confusing, often presenting all aspects of the network in one very large diagram that is difficult to follow. Accordingly, there is a need for tools that allow a user, such as a system administrator, to rapidly determine what is happening in terms of network structure, connection speed, security, etc. at multiple layers of abstraction.

BRIEF SUMMARY

Some embodiments provide a method for generating a multi-layer interactive network map from network configuration data for a network. Based on network configuration data that defines network components and connections between these network components (e.g., logical and/or physical network components and connections), the method generates (i) multiple data layers for different levels of hierarchy of the multi-layer interactive map and (ii) visual representations of the network for each data layer. Each data layer includes different network components and connections, and thus each visual representation is a map of the network that includes the network components and connections belonging to the corresponding data layer.

In some embodiments, the network configuration is received from a network management application that a network administrator uses in order to configure the network. The network configuration may define one or more logical networks that are implemented by physical components within a datacenter or across multiple datacenters in some embodiments. Such logical networks include logical routers, logical switches, logical ports (of both the logical routers and logical switches), as well as additional logical components (e.g., load balancers, firewalls, etc.). These logical components are implemented (often in a distributed manner) by physical network components (e.g., software forwarding elements that execute in virtualization software of servers), physical switches and routers, etc.

Depending on the type of network configuration, different embodiments include different types of layers in the generated network map. For instance, in some embodiments the highest data layer of the network map shows a geographical view of the (possibly multiple) datacenters where the network is implemented (e.g., as geographical locations) with communication connections between the datacenters. Below this are additional layers with progressively more detail about the network. For instance, some embodiments include a network orchestration layer that shows various network domains within the datacenters, a management plane layer that shows the logical network components and structure, a data plane layer that shows the physical network components implementing the logical network, and a physical layer that shows the full physical network with all of its components and connections. In some embodiments, certain network components are only included in certain data layers (e.g., a logical router is part of the management plane layer, but not the highest geographical layer or the lower physical network layer), while other components are included across numerous data layers (e.g., a logical network endpoint such as a virtual machine may be included in the management plane layer, data plane layer, physical network layer, and/or additional data layers).

In addition, some embodiments generate a set of overlays for one or more of the data layers, based on at least (i) the network configuration data and (ii) runtime monitoring of the network. Each overlay of some embodiments includes additional information about an aspect of the network (e.g., types of configuration data, runtime information, etc.). For instance, these overlays may identify how a particular policy specified by the network is applied to the components and connections included in the data layer, which physical components implement a particular logical forwarding element or other logical component, etc. In addition, some embodiments define runtime overlays for which current data is filled in when a user views the multi-layer network map, such as a latency or other network performance overlay that shows current network performance data for physical forwarding elements or the connections between them.

The multi-layer interactive network map of some embodiments can be displayed within an application graphical user interface (GUI) that allows a user (e.g., a network administrator) to view and monitor various aspects of the network. In some embodiments, the GUI displays the visualizations of the data layers, which include selectable items (e.g., representing certain network components, connections, or other data) enabling the user to navigate from one data layer visualization to another. When a user selects one of these items, the application displaying the GUI navigates to a new layer (possibly focusing on a specific portion of that layer based on the specific item selected). For example, if a user selects a particular datacenter in the visualization of the highest-level data layer, then some embodiments display a network orchestration layer visualization of the selected datacenter.

These selectable items in each layer act as links to the other layers of the network map. Through these links, a user can progressively zoom in on certain physical and/or logical aspects of the network (e.g., zooming in on a particular virtual machine and its surrounding physical network). Similarly, in some embodiments, users can zoom in or out to view different network layers in the hierarchy via other GUI interactions without selecting items for specific network components.

In addition, some embodiments include selectable items for the network overlays generated for each data layer, or other mechanisms for selecting these overlays. Upon receiving a selection corresponding to a particular overlay, the application displays the overlay, which could include additional graphical representations of logical and/or physical network components and connections, as well as textual information (e.g., showing current network conditions). These overlays could visually show, for example, virtual machines status (e.g., functioning properly, slow, completely disabled, etc.), display network performance metrics (e.g., throughput, latency, available bandwidth, etc.), the location of malware infections, and many other types of data.

The preceding Summary is intended to serve as a brief introduction to some embodiments of the invention. It is not meant to be an introduction or overview of all of the inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments provide a method for generating a multi-layer interactive network map from network configuration data for a network. Based on network configuration data that defines network components and connections between these network components (e.g., logical and/or physical network components and connections), the method generates (i) multiple data layers for different levels of hierarchy of the multi-layer interactive map and (ii) visual representations of the network for each data layer. Each data layer includes different network components and connections, and thus each visual representation is a map of the network that includes the network components and connections belonging to the corresponding data layer.

Figure 1:
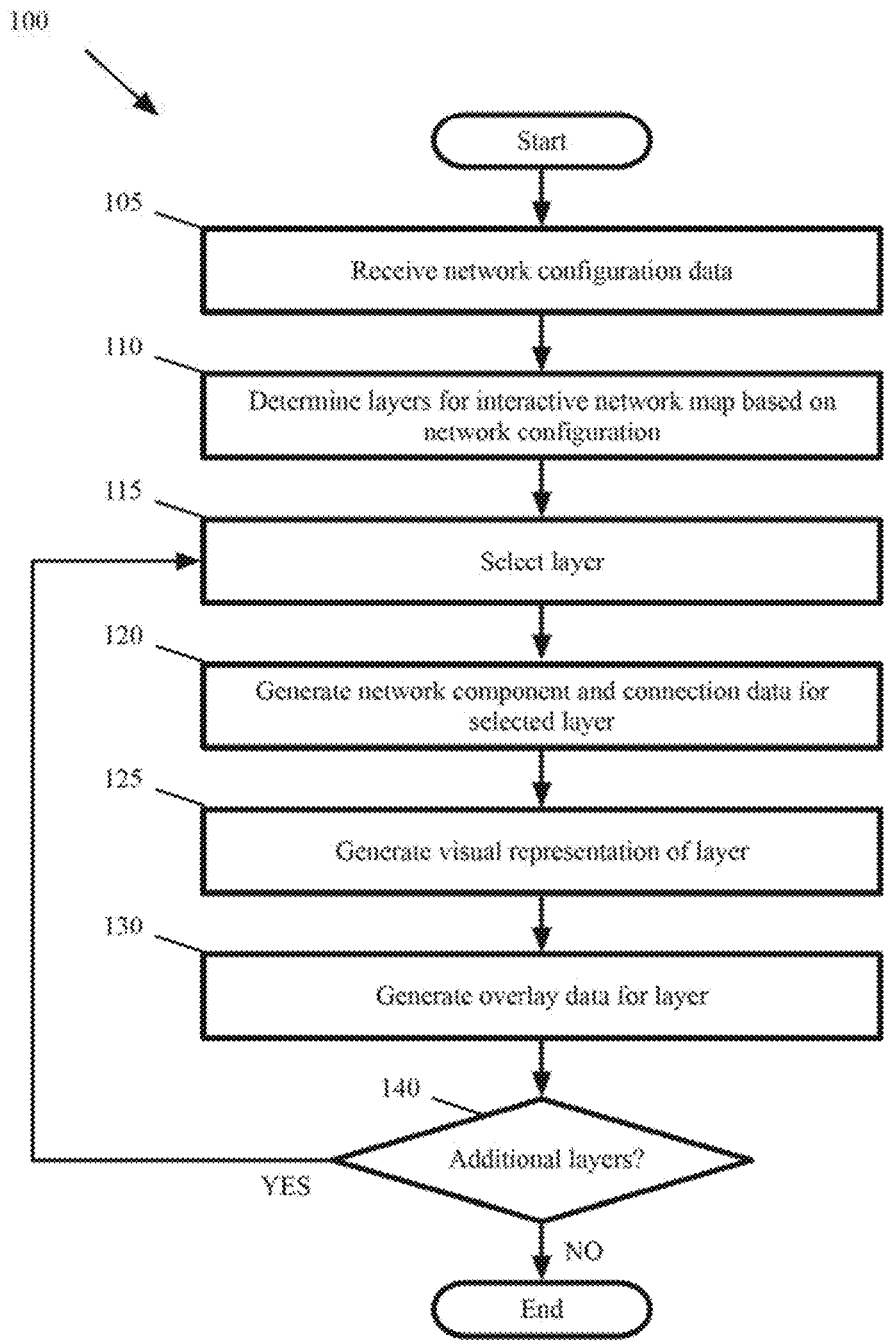
FIG. 1 conceptually illustrates a process of some embodiments for generating the layers and overlays for a multi-layer interactive network map of some embodiments.

FIG. 1 conceptually illustrates a process 100 of some embodiments for generating the layers and overlays for a multi-layer interactive network map of some embodiments. This process 100 is performed by a network visualization application in some embodiments, and based on a network configuration (e.g., a logical network configuration). In some embodiments, the network visualization application generates this interactive network map for numerous network configurations in a datacenter (e.g., numerous logical networks might be implemented in a multi-tenant datacenter, with the application generating separate network maps for each) so that these maps are available if a network administrator requests to view the map for a particular network managed by that administrator. In other embodiments, the network visualization application generates the multi-layer network map at runtime upon request by the administrator.

As shown, the process 100 begins by receiving (at 105) network configuration data that defines the network components and connections between the components for multiple layers of the network. In some embodiments, the network configuration is received from a network management application that a network administrator uses in order to configure the network. The network configuration may define one or more logical networks that are implemented by physical components within a datacenter or across multiple datacenters in some embodiments. Such logical networks include logical routers, logical switches, and logical ports (of both the logical routers and logical switches), as well as additional logical components (e.g., load balancers, firewalls, etc.). These logical components are implemented (often in a distributed manner) by physical network components (e.g., software forwarding elements that execute in virtualization software of servers, physical switches and routers, etc.). In addition, some embodiments receive current physical network data indicating the actual physical components of the network on which the logical networks are implemented (e.g., the physical servers, switches, routers, etc.).

The network configuration data may include different layers. For example, the network configuration data could apply to a particular datacenter or to multiple datacenters over a geographical area (e.g., datacenters in multiple cities around the world). Accordingly, the process then determines (at 110) what layers the interactive map should have based on the received network configuration data. For example, in some embodiments the highest data layer of the network map shows the above-mentioned geographical view of the (possibly multiple) datacenters where the network is implemented (e.g., as geographical locations) with communication connections between the datacenters. Below this are additional layers with progressively more detail about the network. For instance, some embodiments include a network orchestration layer that shows various network domains within the datacenters, a network architecture layer that shows network segments of a network domain, a management plane layer that shows the logical network components and structure, a data plane layer that shows the physical network components implementing the logical network, and a physical layer that shows the full physical network with all of its components and connections.

After determining what layers to produce, the process selects (at 115) a layer to generate. This may be the highest level of the hierarchy, the lowest, or the layer may be selected in some other order. The process then generates (at 120) the network component and connection data (for the connections between the various components) for that selected layer. In some embodiments, certain network components are only included in certain data layers (e.g., a logical router is part of the management plane layer, but not the highest geographical layer or the lower physical network layer), while other components are included across numerous data layers (e.g., a logical network endpoint such as a virtual machine may be included in the management plane layer, data plane layer, physical network layer, and/or additional data layers).

In some embodiments, some or all of the components and/or connections of a particular layer are designated as links to another layer (e.g., a lower layer). In some embodiments, each layer in the multi-layer map hierarchy is more detailed than the layer above, but each layer covers the same network. Therefore, in some embodiments, each layer is correspondingly larger in terms of the number of components it contains and requires a larger visual area to represent the entire network. To facilitate navigation, the different links of a layer of some embodiments may be links to a different location on the lower layer (i.e., the part of the lower layer that includes the network components/connections at that layer that correspond to the linked component at the previous layer). For example, in a geographical layer showing multiple datacenters in different locations of the world, each of the datacenters is represented by a selectable item providing a link to a more detailed view of that datacenter network.

The process 100 then generates (at 125) a visual representation of the layer. The visual representation includes the components and connections of the network that are appropriate to that layer of the network. Depending on the layer, the visual representation may include icons representing the individual components and lines (representing communication channels) linking the icons. The visual representation of some embodiments is a set of coordinates for various components, data identifying the communication connections between the components and data allowing the icons corresponding to those components to be displayed when a particular portion of that layer is being viewed. In some embodiments, the visual representation may include one or more image files. For example, a visual representation of the geographical layer may include an image file of a map of the geographical area in addition to the coordinates of the individual datacenters.

The process 100 also generates (at 130) a set of overlays for the current data layer. Various overlays may be based on one or both of (i) the network configuration data and (ii) runtime monitoring of the network. Each overlay of some embodiments includes additional information about an aspect of the network (e.g., types of configuration data, runtime information, etc.). For instance, these overlays may identify how a particular policy specified by the network is applied to the components and connections included in the data layer, which physical components implement a particular logical forwarding element or other logical component, etc. Policies are generally part of an initial network configuration, but are subject to updating, and the physical components that implement a particular logical forwarding element likewise are part of an initial configuration, but also subject to change for various reasons such as network load, component failure, VM migration, etc. As such, in some embodiments these overlays are based on both the configuration data and the runtime monitoring data and are generated as templates with initial values subject to updating as needed. Even in cases where an overlay is displaying solely runtime data, some embodiments define templates for runtime overlays. The templates are then filled in with current data when a user views the multi-layer network map with that overlay. For example, a latency or other network performance overlay may show current network performance data (e.g., bit transfer rate, ping time, transmission error rate, etc.) for physical forwarding elements or the connections between them.

The process 100 then determines (at 140) whether additional layers should be generated. If additional layers are needed, the process 100 returns to operation 115 to select the next layer. Once the network component and connection data, visual representation, and overlays have been generated for all of the data layers of the multi-layer network map, the process 100 ends.

Figure 2:
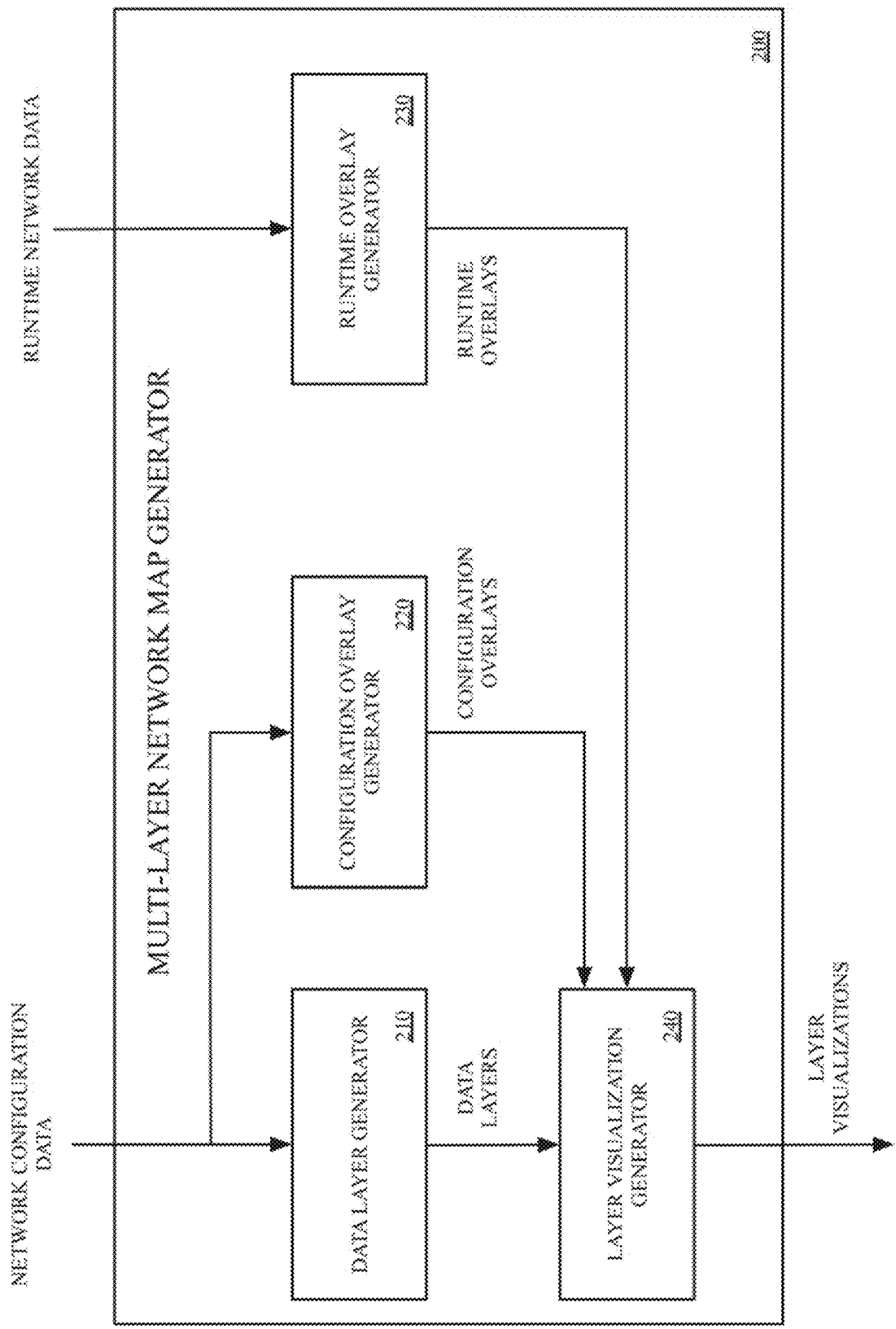
FIG. 2 conceptually illustrates a multi-layer network map generator of some embodiments for performing a multi-layer network map generation process.

The network map generation process is performed by a network visualization application or network visualization component of a network management application in some embodiments. FIG. 2 conceptually illustrates a multi-layer network map generator 200 (e.g., such an application or component of an application) of some embodiments for performing the multi-layer network map generation process (e.g., the process 100 of FIG. 1). The network map generator 200 includes a data-layer generator 210, a configuration overlay generator 220, a runtime overlay generator 230, and a layer visualization generator 240.

The data layer generator 210 of some embodiments receives network configuration data (e.g., as in operation 105 of FIG. 1) and generates the network component and connection data to be used in generating the layer visualizations for the network map (e.g., as in operation 120 of FIG. 1). The data layer generator 210 generates these data by translating data about the various components of the network (as provided in the network configuration data) into a form that separates out the components specific to each layer from the network data (as the network configuration data may not be received in a layered format). For example, in some embodiments, network configuration data may provide information about the network as an interconnected entity at a logical level and the components at a higher level that correspond to groups of lower level components, but not specify the connections between the components at the higher level. In such cases, the data layer generator extrapolates the connections between higher level components from the connections between lower level components. The data layer generator 210 also generates the links between the components and the lower layer maps representing the components of that layer that correspond to the linked component (and in some cases other nearby components).

The configuration overlay generator 220 also receives network configuration data. This data may be a subset of the network configuration data provided to the data layer generator, different network data, or the same network data received by the data layer generator 210. Although the figure shows the network configuration data splitting off to be received separately by the data layer generator 210 and the configuration overlay generator 220, in some embodiments, the network configuration data is received by a data layer generator and passed from that generator to the configuration overlay generator. The configuration overlay generator 220 generates the portion of the overlay data that is based on the network configuration (e.g., the initial policies that apply to components at the level the overlay corresponds to, etc.). During runtime, the runtime overlay generator 230 receives runtime network data, generates runtime overlays, and sends them to the layer visualization generator 240. In other embodiments, templates for the runtime overlay data are generated by the configuration overlay generator and are filled in with runtime data during runtime without using a separate runtime overlay generator 230.

The layer visualization generator 240 receives the data layers from the data layer generator 210, the configuration overlays from the configuration overlay generator 220, and the runtime overlays from the runtime overlay generator 230. The layer visualization generator 240 generates a visual representation of each layer based on the received data layers and the overlays. In some embodiments, this generated data is stored in a format as shown in FIG. 3.

Figure 3:
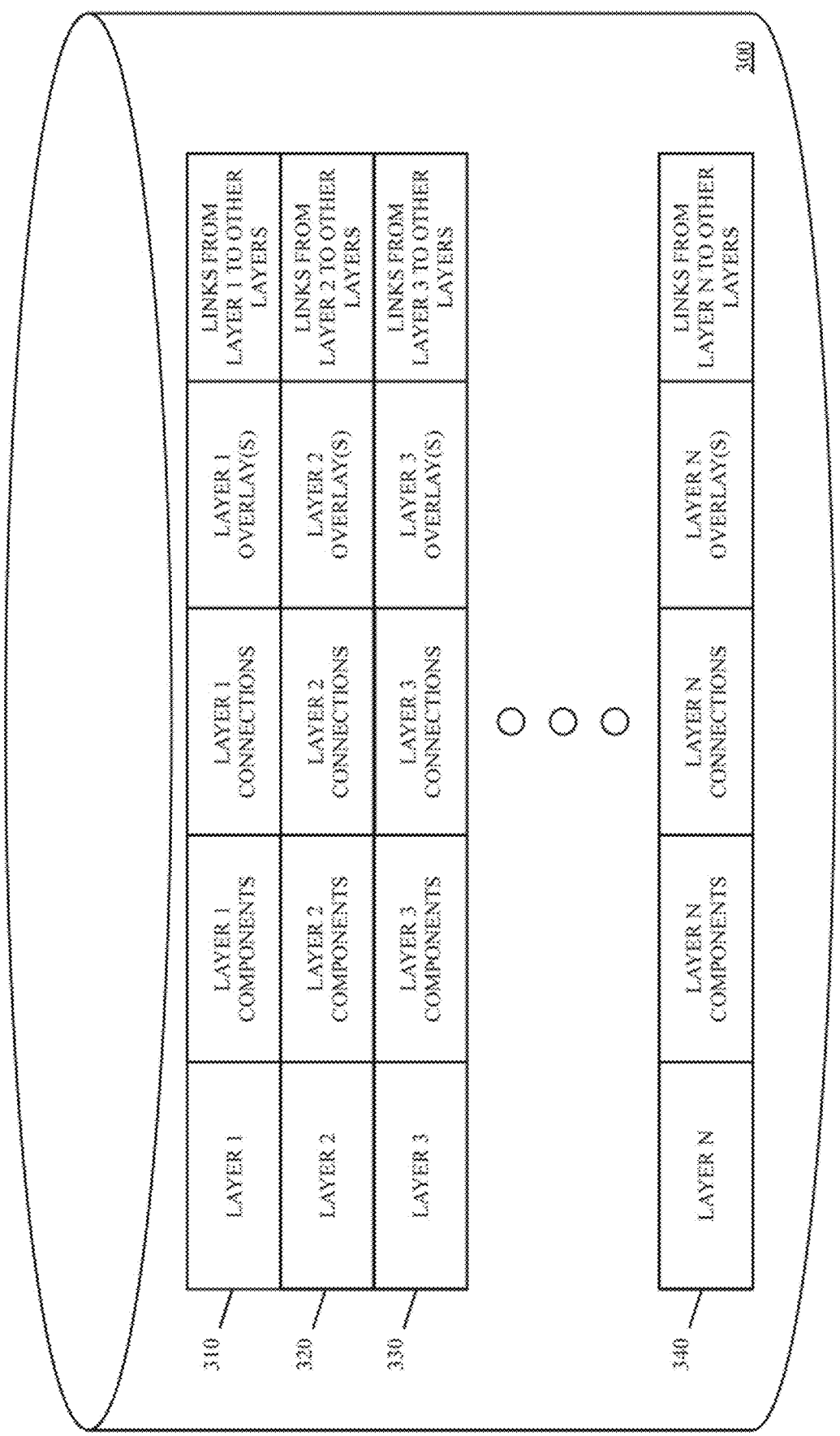
FIG. 3 conceptually illustrates the data structure of the data layers produced by a data layer generator.

FIG. 3 conceptually illustrates the data structure of an interactive multi-layer network map produced by a network visualization application of some embodiments. FIG. 3 illustrates a data storage 300 with multiple data layers 310-340 of the network map stored in the storage 300. Each data layer 310-340 includes an identifier of the layer (e.g., identifying the layer as a geographical layer, network orchestration layer, management plane layer, etc. Each data layer 310-340 also includes the layer components (e.g., coordinates and type of component for each component at that layer). The layers also include the connections between the components on that layer (e.g., which components are connected to each other and the nature of the connection, such as bit width, speed, etc.). Each data layer 310-340 has data for the overlays that may be applied to that layer, and the links from that layer to the lower layer (e.g., an identifier of a component of layer 1 that is linked to layer 2 and the specific area of layer 2 to which it links).

The multi-layer interactive network map of some embodiments can be displayed within an application graphical user interface (GUI) that allows a user (e.g., a network administrator) to view and monitor various aspects of the network. In some embodiments, the GUI displays the visualizations of the data layers, which include selectable items (e.g., representing certain network components, connections, or other data) enabling the user to navigate from one data layer visualization to another. When a user selects one of these items, the application displaying the GUI navigates to a new layer (possibly focusing on a specific portion of that layer based on the specific item selected). For example, if a user selects a particular datacenter in the visualization of the highest-level data layer, then some embodiments display a network orchestration layer visualization of the selected datacenter.

Figure 4:
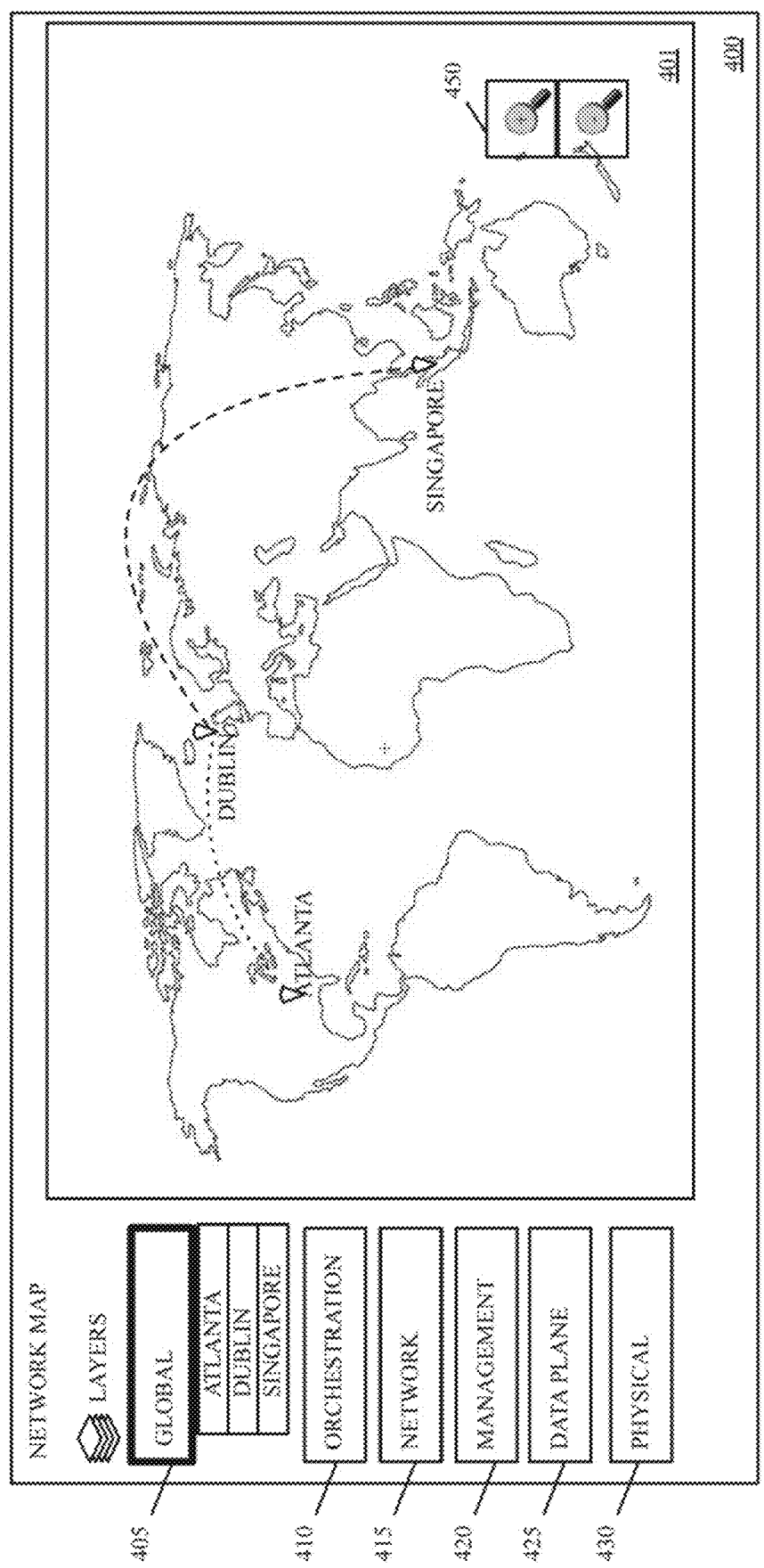
FIG. 4 illustrates a GUI for viewing multi-layer network maps while that GUI displays a geographical layer of the multi-layer network map.

FIGS. 4-11 illustrate various example screens of such a GUI. FIG. 4 illustrates a GUI 400 for viewing multi-layer network maps while that GUI displays a geographical layer of the multi-layer network map. The GUI 400 includes a geographical display map 401, a geographical layer selector 405, an orchestration layer selector 410, a network architecture layer selector 415, a management plane layer selector 420, a data plane layer selector 425, a data plane layer selector 430, and zoom controls 450.

The geographical display map 401 shows a map of a geographically distributed network of datacenters. In this case, the map 401 includes data centers in Dublin, Singapore, and Atlanta. The GUI 400 allows each of these datacenters to be selected and upon the selection of a datacenter, the GUI 400 changes to the next map layer (here, the orchestration layer) that provides a more detailed view of the network within the selected datacenter. In this case, the next layer is the orchestration layer, which is further described by reference to FIG. 5, below. The GUI 400 of some embodiments allows a user to select a datacenter directly from the map, or to select the name of the location of the datacenter displayed as part of the geographical layer selector 405.

The geographical layer selector 405 in the illustrated embodiment acts as both a selectable control (to return to the map of the geographical layer when the GUI 400 is displaying a different layer) and an indicator that the geographical layer is presently displayed. The illustrated embodiment thickens the line around the geographical layer selector to indicate that the geographical layer is selected, however, it should be understood that in other embodiments, other indicators may be used (e.g., changing color, brightness of the selector, etc.). The selectors 410-430 allow a user to directly change to a particular layer of the map without selecting a component at each layer to proceed through the layers. The GUIs of various embodiments provide various indicators when providing a multi-layer map in which the network configuration data omits one or more of the layers that the GUI would usually display. In some embodiments, the controls, such as selectors, for the missing layers are simply omitted. In other embodiments, to maintain a consistent user interface across different networks, the unavailable layers are displayed as options, but are "grayed out" or otherwise indicated as inactive options. The layers selected with the selectors 410-430 are further described with respect to FIGS. 5-8, below. In some embodiments, the zoom controls 450, when activated, cause the GUI to zoom in or out within a particular map layer (e.g., if two data centers are in a small geographical region on the top-level network map, it may be necessary to zoom in to that area to distinguish them). In some embodiments, the zoom controls also allow a user to switch between layers of the map. For example, zooming in to a datacenter on the geographical map opens the next layer for that particular data center, or zooming out far enough on one layer may cause the GUI to display the next higher layer.

Figure 5:
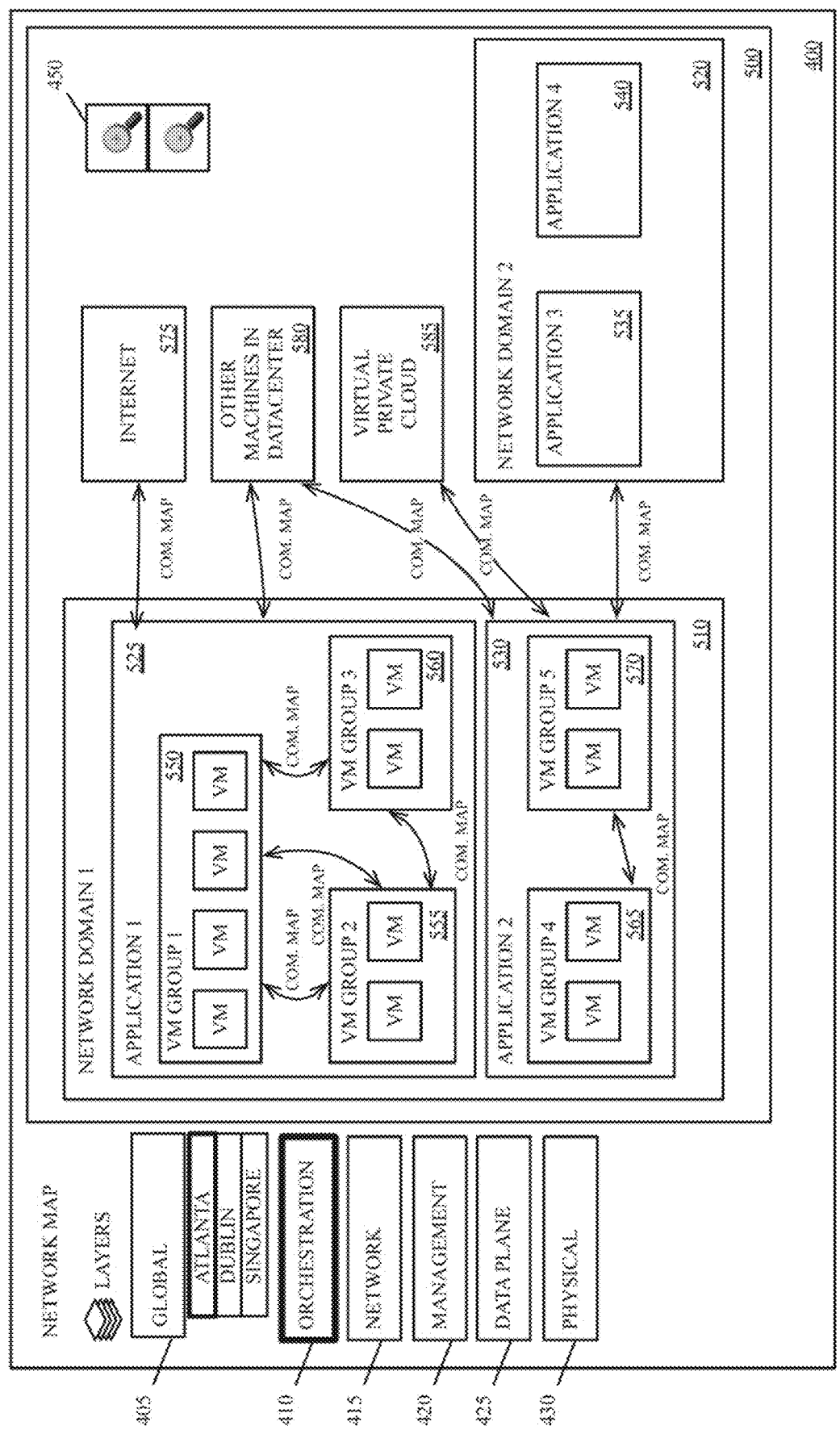
FIG. 5 illustrates a GUI displaying an orchestration layer of a multi-layer network map.

FIG. 5 illustrates the GUI 400 displaying an orchestration layer 500 of the multi-layer network map. The GUI of some embodiments displays this layer when a user selects a datacenter (in this case, the Atlanta datacenter), either directly on the geographical map 401 (of FIG. 4) or by selecting the name "Atlanta" on the list displayed under the geographical layer selector 405. The GUIs of some embodiments also display the orchestration layer in response to a user activating the orchestration layer selector 410. Some embodiments provide a visual indicator that the GUI 400 is displaying the orchestration layer 500 as indicated in this figure by the thickened line of the orchestration layer selector 410. The orchestration layer 500 displays network domains 510-520. The network domains 510 and 520 are collections of application constructs 525-540. Individual application constructs are made up of data compute nodes (DCNs) such as virtual machines (VMs), containers (in some embodiments including groups of DCNs, VMs, etc.), IP addresses or any other entity which realizes into a VM/IP/MAC, etc.

In the embodiment illustrated in FIG. 5, application 525 includes virtual machine groups 550-560, which in turn include multiple virtual machines. Similarly, application 530 includes virtual machine groups 565 and 570. In some embodiments, communication maps illustrate how various entities will communicate with each other given a defined set of policies. In this layer, policies encompass the intended channels of communication between various entities. For example, one policy may allow TCP communication between two entities (VMs, VM groups, applications, IPs, networks, other machines, etc.), such as between the network domain 510 and the network domain 520. In some embodiments, communication maps represent different protocols and/or different channels of communication (e.g., through different sets of ports). In this example, there are two communication maps between VM group 550 and VM group 555. These communications maps may represent an HTTP communication channel and a more general TCP communication channel or another set of two communications protocols/channels.

In addition to communications maps showing communication channels within a network domain, the GUI of some embodiments shows communication channels between network domains and other entities. Shown in this figure are communications maps between application 525 and the internet 575, between application 525 and other machines in the datacenter 580, between application 530 and other machines in the datacenter 580, between application 530 and virtual private cloud 585, and between application 530 and network domain 520.

The embodiment illustrated in FIG. 5 shows detailed structure of the applications only for network domain 510. Some embodiments show detailed structures for one network domain at a time. However, other embodiments show detailed structures for multiple network domains at the same time. In some embodiments, the various details shown are part of the basic layer display, while in other embodiments, some of the displayed information may be part of an overlay. For example, an overlay may show additional details about communications maps between the various elements of the layer. While the illustrated embodiment shows all VMs in an application as being part of a VM group, in some embodiments, some or all VMs included in an application may not be grouped into distinct VM groups.

The network domains 510-520, applications 525-540, VM groups 550-570 and/or communication maps in some embodiments are selectable items that, when selected, cause the GUI 400 to display the next lower network map layer. In other embodiments, some of these components are selectable to cause the GUI 400 to display the next lower map layer (e.g., the network domains) while other components are selectable to cause other GUI operations (e.g., selection of a particular application causing the GUI to provide additional information about the application). The next lower layer in the illustrated embodiment is the network architecture layer illustrated in FIG. 6.

Figure 6:
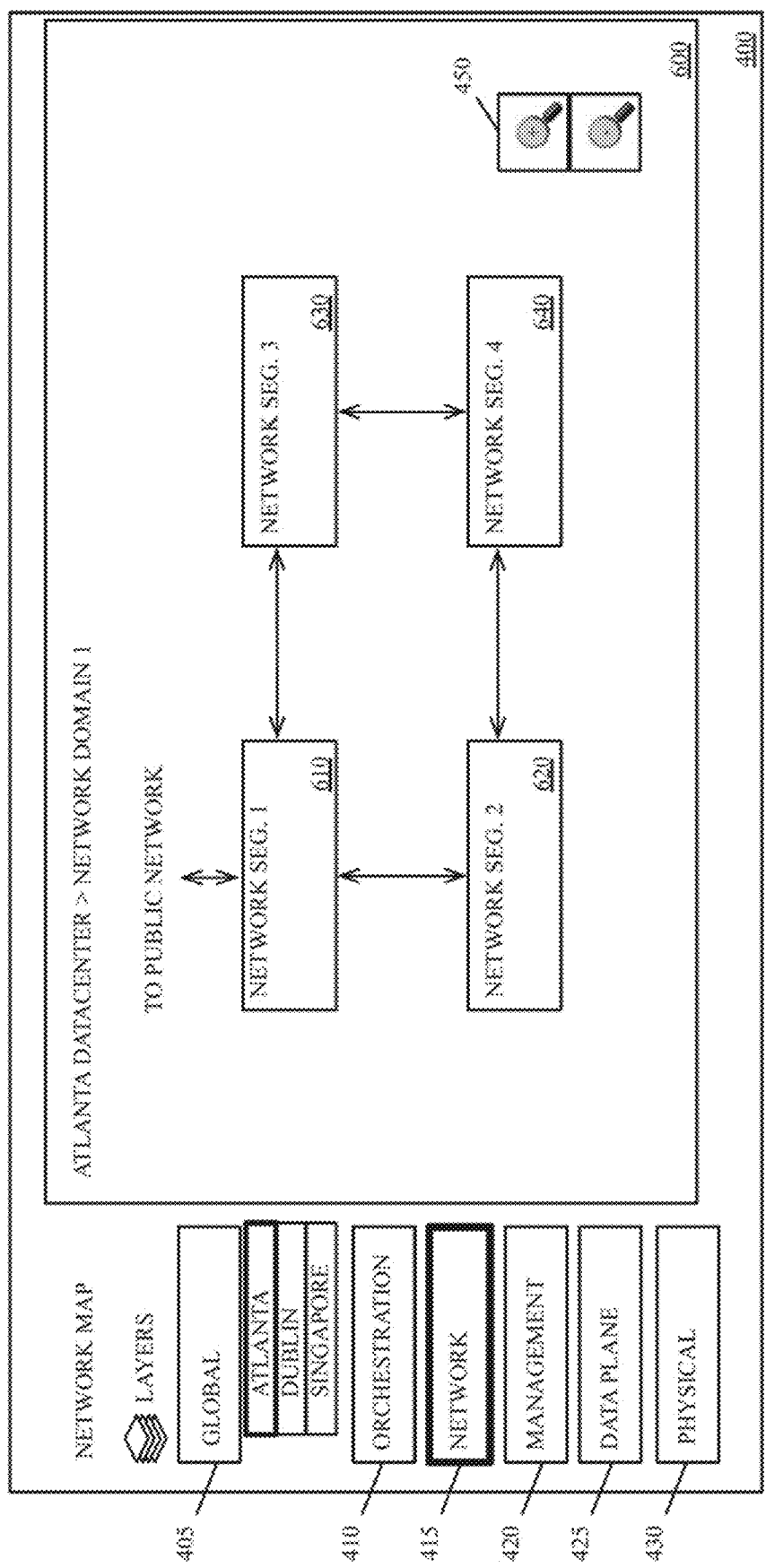
FIG. 6 illustrates a GUI displaying a network architecture layer of a multi-layer network map.

FIG. 6 illustrates the GUI 400 displaying a network architecture layer 600 of the multi-layer network map. The GUI of some embodiments displays this layer when a user selects a network domain on the orchestration layer 500 (of FIG. 5). In this figure, the network architecture layer shows a specific network domain of the Atlanta datacenter. The GUIs of some embodiments also display the network architecture layer in response to a user activating the network architecture layer selector 415. Some embodiments provide a visual indicator that the GUI 400 is displaying the network architecture layer 600 as indicated in this figure by the thickened line of the network architecture layer selector 415. The network architecture layer 600 displays a physical view of a network domain, with network segments 610-640 and the connections between them and between the segments and outside networks. In some embodiments, the network segments 610-640 are selectable items that, when selected, cause the GUI 400 to display the next lower network map layer. The next lower layer in the illustrated embodiment is the management layer illustrated in FIG. 7.

Figure 7:
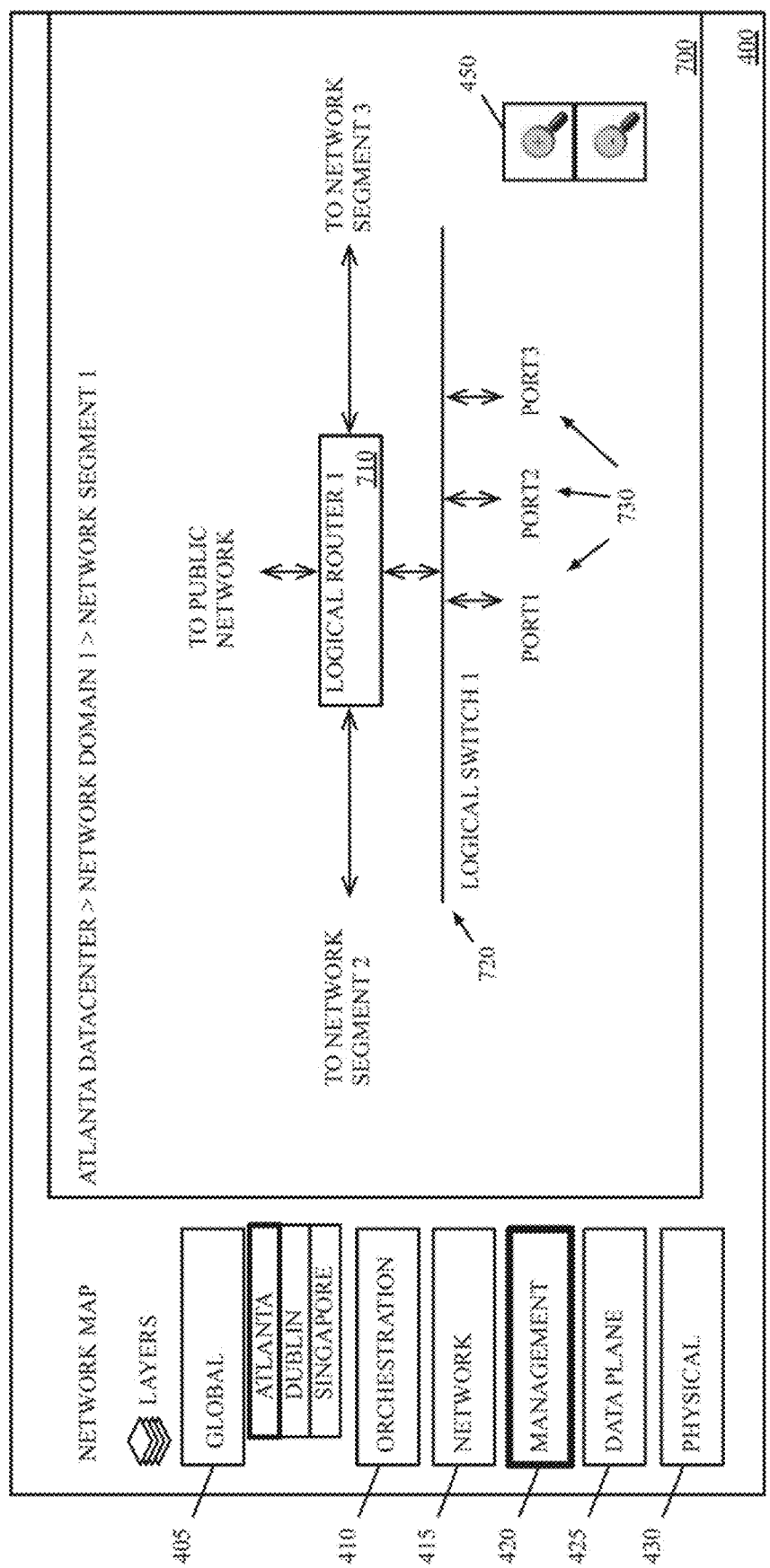
FIG. 7 illustrates a GUI displaying a management plane layer of the multi-layer network map.

FIG. 7 illustrates the GUI 400 displaying a management plane layer 700 of the multi-layer network map. The GUI of some embodiments displays this layer when a user selects a network segment on the network architecture layer 600 (of FIG. 6), or otherwise navigates to the management plane layer. In this figure, that is network segment 610 (in FIG. 6) of a network domain of the Atlanta datacenter. The GUIs of some embodiments also display the management plane layer in response to a user activating the management plane selector 420. Some embodiments provide a visual indicator that the GUI 400 is displaying the management plane layer 700 as indicated in this figure by the thickened line of the management plane layer selector 420.

The management plane layer 700 displays a logical router 710, logical switch 720, and ports 730 and the connections between them and between the logical switch 720, and ports 730. In the illustrated example, the logical router 710, the logical switch 720 and ports 730 implement the network segment 610 (of FIG. 6). Accordingly, the logical router 710 connects to network segment 2 and to network segment 3. The GUIs of embodiments allow a user to move between different portions of a layer. For example, some GUIs allow a user to view different portions of the management plane layer 700. In such embodiments, a user may move the layer to the left, the right, up, or down to view adjacent portions of the layer. In some embodiments, in the adjacent portion of the management layer are the nearby segments which contain their own logical routers and logical switches. In some embodiments, multiple network segments may be represented in one screen of the management plane layer 700 (e.g., after zooming out with zoom controls 450). In such embodiments, the logical routers, logical switches, and ports of network segment 2 and/or network segment 3 would be shown (after zooming out) as well as the presently displayed logical router 710.

It should also be understood that in some cases the logical network will not be segmented, and the management plane layer displays the entire logical network in a single navigable view. For instance, a logical network might include multiple tiers of logical routers, one or more logical switches connecting to several of the logical routers, etc. In addition, some embodiments also show the VMs or other DCNs that connect to the logical ports of the logical switches.

The logical router 710, the logical switch 720 and ports 730 in some embodiments are selectable items that, when selected, cause the GUI 400 to display the next lower network map layer. The next lower layer in the illustrated embodiment is the data plane layer illustrated in FIG. 8. The logical routers and switches of the management layers are each implemented by multiple virtual switches (or other configurable forwarding elements) of the data plane layer. This representation in some networks is on a many-to-many basis. That is, a logical switch in the management layer may have a logical connection (in the management plane) to virtual machines or other data compute nodes that are implemented on different hosts of the network, and thus the forwarding elements executing on these multiple hosts all implement the logical switch. Furthermore, a single host computer may implement multiple virtual machines that are logically connected to multiple different logical switches, such that one virtual switch may be used when implementing multiple logical switches.

The management plane layer 700 may be displayed with various types of overlays in some embodiments. For example, in some embodiments, the GUI can display the management layer 700 with an overlay that shows the bandwidth between network segments, the logical firewalls between components, statistics for logical ports, statistics for logical forwarding elements that are aggregated from the numerous virtual switches and other physical forwarding elements that implement the logical forwarding elements, etc.

Figure 8:
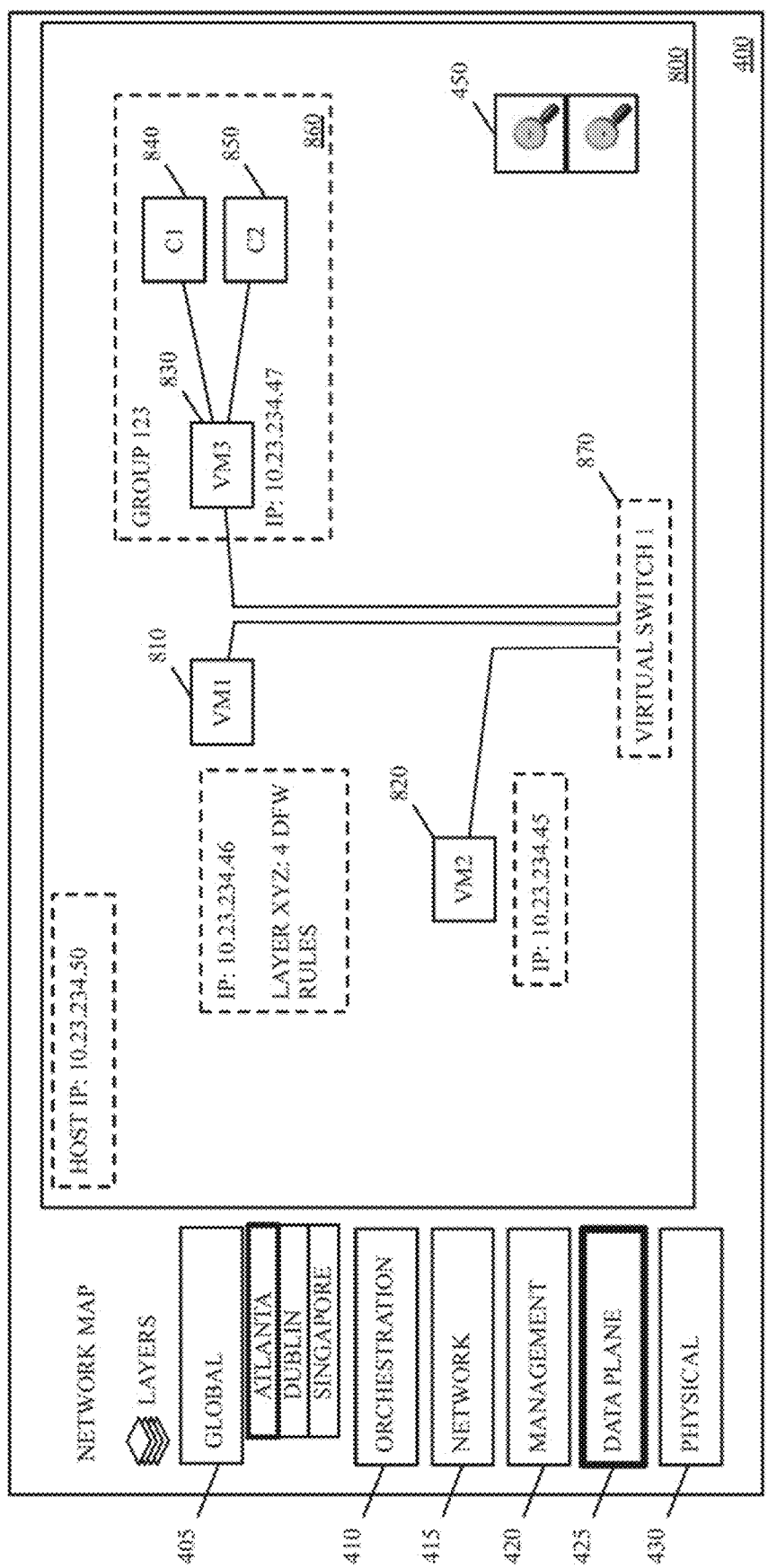
FIG. 8 illustrates a GUI displaying a data plane layer of the multi-layer network map.

FIG. 8 illustrates the GUI 400 displaying a data plane layer 800 of the multi-layer network map of some embodiments. The GUI of some embodiments displays this layer when a user selects a logical forwarding element, activates the data plane selector 425, zooms in from the management plane layer, etc. Some embodiments provide a visual indicator that the GUI 400 is displaying the data plane layer 800 as indicated in this figure by the thickened line of the data plane layer selector 425. In this figure, the data plane layer 800 displays various network data (e.g., IP addresses) relating to virtual machines 810-850, a group 860 with a virtual machine 830 that hosts containers 840 and 850, and a virtual switch 870 that connects virtual machines 810-830 to each other, to other virtual machines (not shown) on the same host, or to machines outside the host. As shown, the containers 840 and 850 do not connect directly to virtual switch 870, but execute on a virtual machine 830 that does connect directly to the virtual switch 870. However, in some networks, all communications between virtual machines on a host pass through virtual switches. The GUIs of some embodiments allow a user to move or zoom within a layer. Zooming out in the data plane layer from the illustrated view may reveal other virtual switches and virtual machines on the same host. Zooming out still further could reveal multiple hosts and multiple virtual connections between the virtual machines on the data plane layer. The revealed hosts by zooming out on the data plane layer 700 in some embodiments are hosts that communicatively connect to the virtual machines in the originally displayed host rather than hosts that are necessarily in close physical proximity to the originally displayed host.

Figure 11:
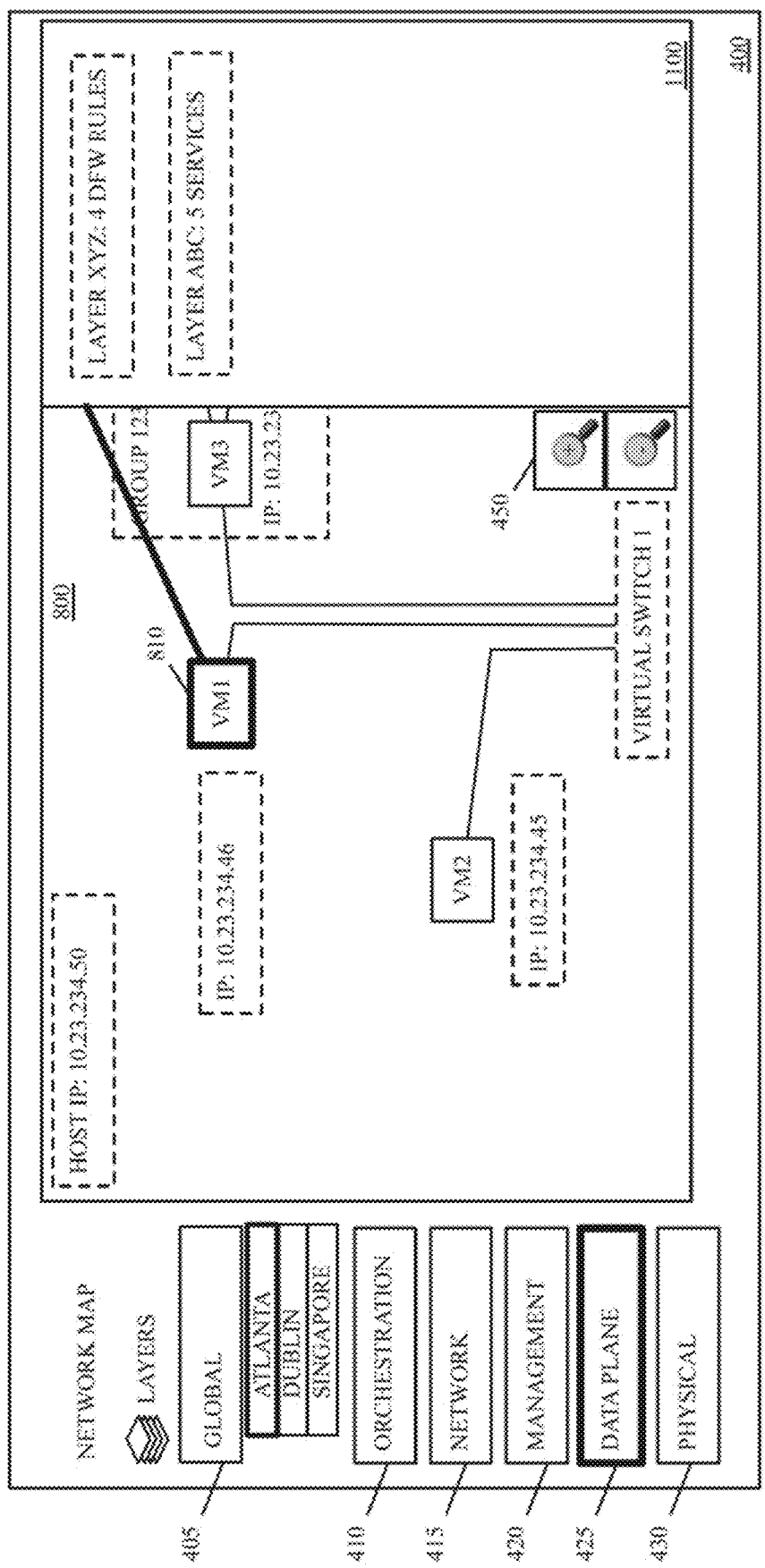
FIG. 11 illustrates a GUI displaying a data plane layer of the multi-layer network map with an overlay that displays additional information about one of the virtual machines.

In addition to showing virtual machines, hosts, and virtual switches, the data plane layer 800 of some embodiments may be overlaid with various overlays that provide additional data about the displayed components. Examples of such overlays for this layer are security overlays that show what specific firewall rules are applied to each virtual machine, what the connection speed is between virtual machines on the host and virtual machines either also on the host or on other hosts, or a policy overlay, such as illustrated in FIG. 11, below.

Figure 9:
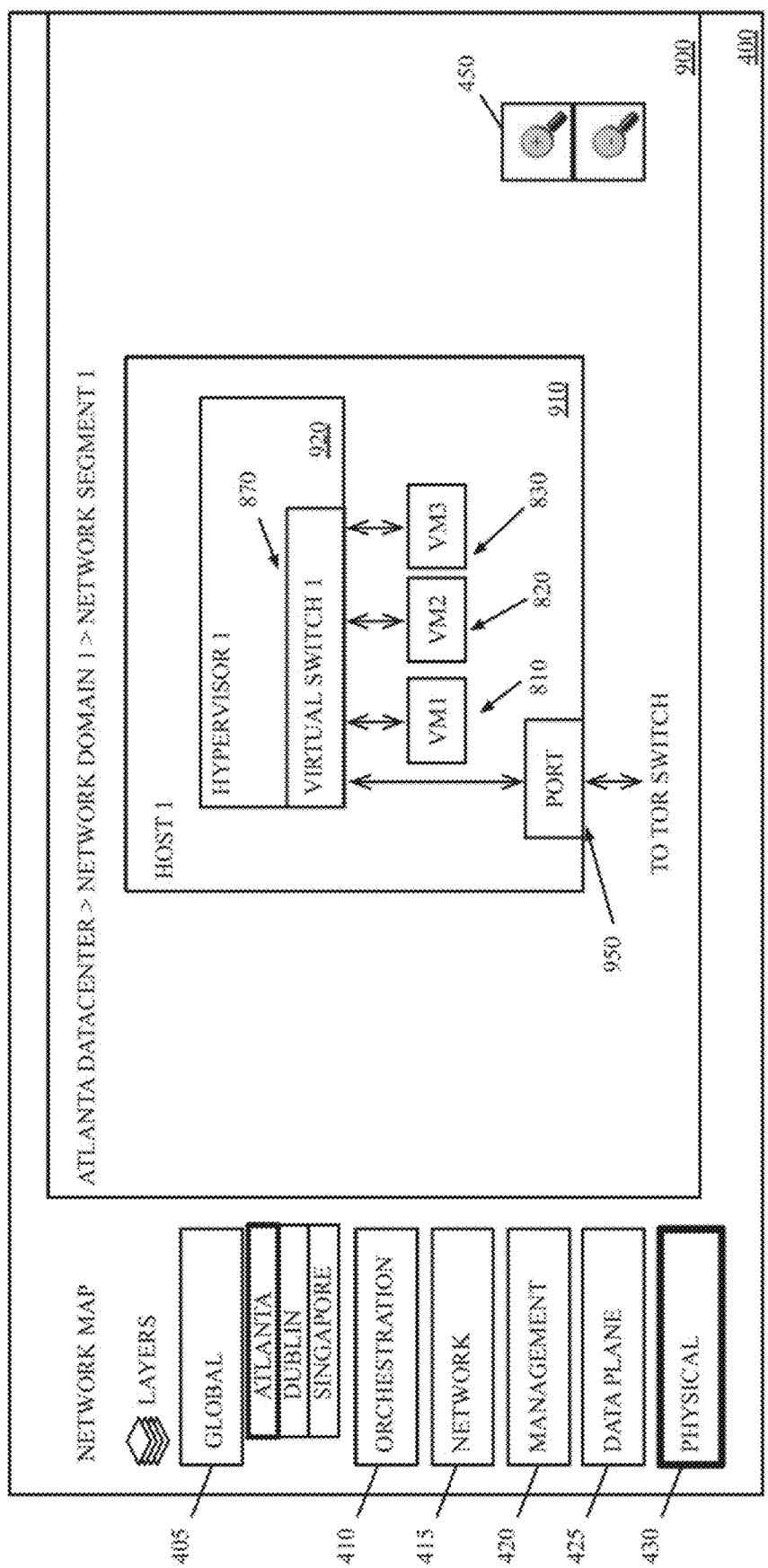
FIG. 9 illustrates a GUI displaying a physical layer of the multi-layer network map.

As shown in this figure and FIG. 9, below, in some embodiments, multiple layers may include some of the same components as other layers, here, both data plane layer 800 and physical layer 900 (as shown in FIG. 9) display host 910 and virtual machines 810-830.

FIG. 9 illustrates the GUI 400 displaying a physical layer 900 of the multi-layer network map. The GUI of some embodiments displays this layer when a user zooms in from the data plane layer (e.g., as shown in FIG. 8), selects a component corresponding to the physical layer, activates the physical layer selector 430, etc. Some embodiments provide a visual indicator that the GUI 400 is displaying the physical layer 900 as indicated in this figure by the thickened line of the physical layer selector 430. In this example, the physical layer 900 displays a host 910 that executes a hypervisor 920. The host 910 represents the aggregate computational power and memory of a server (e.g., a server in a server rack with multiple other servers). The virtual switch 870 operates within the hypervisor 920, and several virtual machines 810-830 connect to the virtual switch. In addition, through a physical interface 950 of the host, the virtual switch connects to a top of rack (ToR) switch.

Figure 10:
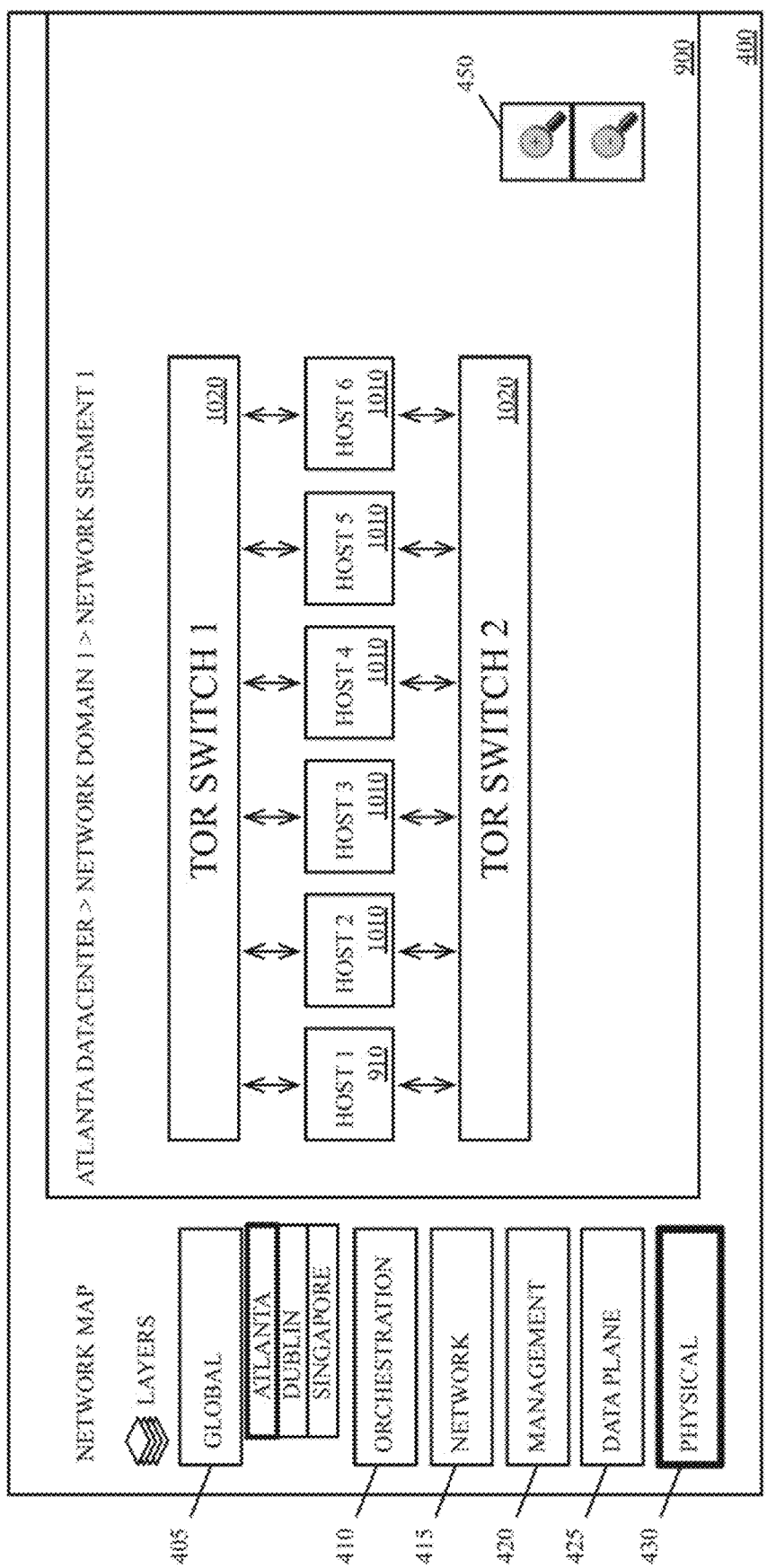
FIG. 10 illustrates a GUI displaying a zoomed out view of a physical layer.

Some embodiments allow a user to zoom out on the physical layer 900 (e.g., using zoom controls 450) to display multiple hosts. FIG. 10 illustrates the GUI 400 displaying a zoomed out view of physical layer 900. This figure includes both the host 910 illustrated in FIG. 9 and multiple additional hosts 1010. Each of the hosts 910 and 1010 connect to two ToR switches 1020 that allow virtual machines on the various hosts 910 and 1010 to communicatively connect with each other and with machines outside the particular server rack on which the servers that embody the hosts 910 and 1010 and the ToRs 1020 reside. The physical layer 900 may include overlays such as an information overlay identifying the capacities of each host (i.e., the aggregate clock speed, memory, etc.), performance overlays identifying what percentage of the capacity of each ToR is occupied (e.g., in order to better balance the demands on each ToR, etc.).

As mentioned above, in addition to network map layers, some embodiments include selectable items for the network overlays generated for each data layer, or other mechanisms for selecting these overlays. Upon receiving a selection corresponding to a particular overlay, the application displays the overlay, which could include additional graphical representations of logical and/or physical network components and connections, as well as textual information (e.g., showing current network conditions). These overlays could visually show, e.g., virtual machines status (functioning properly, slow, completely disabled, etc.), display network performance metrics (e.g., throughput, latency, available bandwidth, etc.), the location of malware infections, and many other types of data. FIG. 11 illustrates the GUI 400 displaying a data plane layer 800 of the multi-layer network map with an overlay 1100 that displays additional information about one of the virtual machines 940. In the illustrated embodiment, the overlay displays the network policies that are applied to the connection to the virtual machine 810. In this example, the policies are 4 distributed firewall (DFW) rules and 5 services. Other embodiments may provide different or additional data in overlays.

Various different GUI controls are provided in various embodiments to activate various overlays. Some embodiments may activate overlays through the use of hotkeys, or with a context menu that activates when performing a particular action on the interface. Examples of such actions in various embodiments are using assorted shift keys (e.g., control, alt, option, etc.) with a mouse click, clicking additional mouse buttons (e.g., right mouse button), turning scroll wheels, click and hold actions, double-clicks, tap and hold on a touch screen, or other control actions with a keyboard, mouse, and/or other input device.

Figure 12:
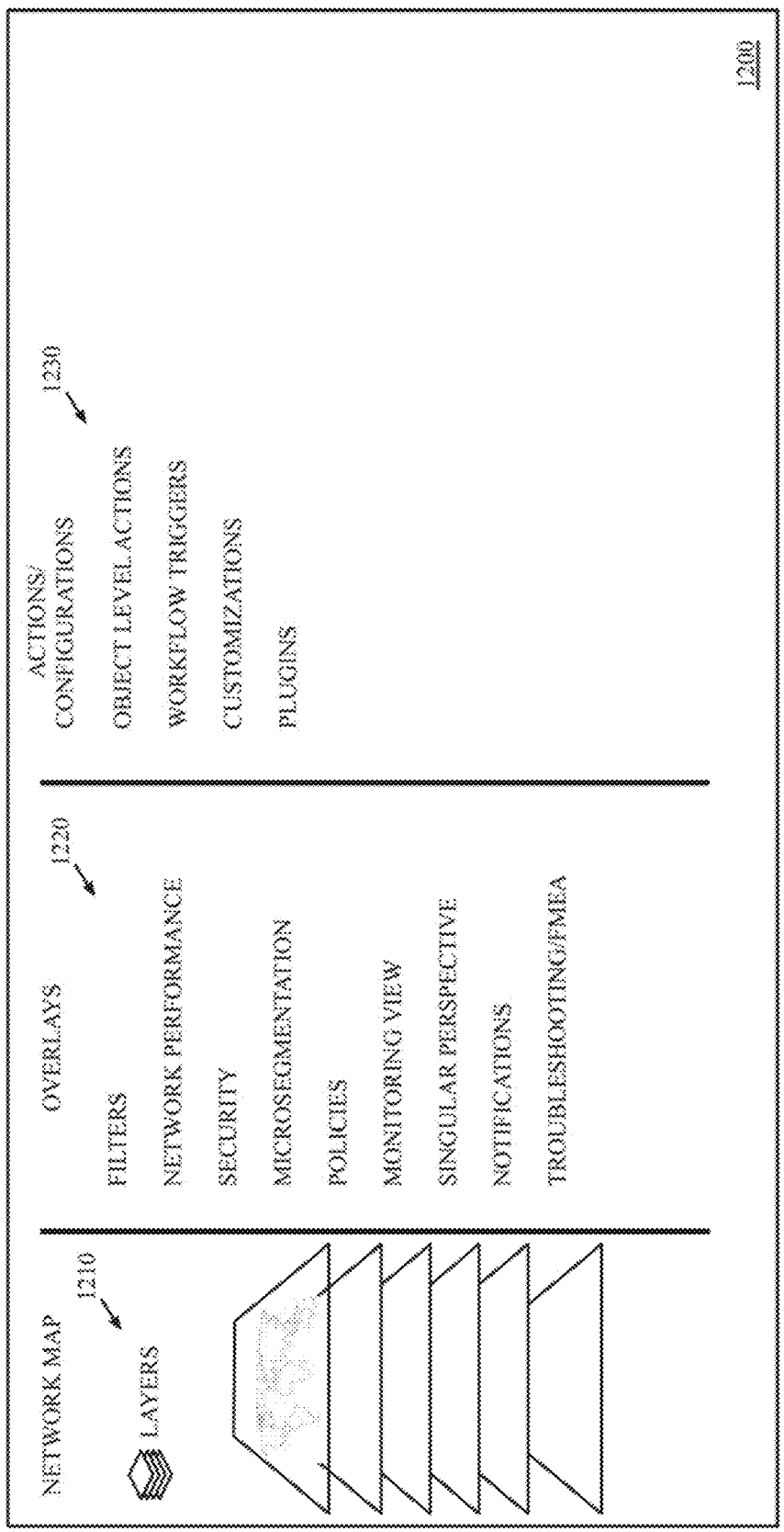
FIG. 12 illustrates an overlay selection screen of some embodiments that allows a user to select a specific overlay from an overlay menu or a set of actions/configuration for the network from an action/configuration menu.

The GUI of some embodiments provides access to an overlay selection menu. FIG. 12 illustrates an overlay selection screen 1200 of some embodiments that allows a user to select a specific overlay from an overlay menu 1220 or a set of actions/configuration for the network from an action/configuration menu 1230. The available overlays in the menu 1220 are filters, network performance, security, microsegmentation, policies, monitoring view, singular perspective, notifications, and troubleshooting/failure modes and effects analysis (FMEA). Filter overlays may include filters that show network components used by a particular client or for a particular application, or other filters that limit the data displayed by some specified characteristic. Network performance overlays may display data including throughput, percentage of packets dropped, ping time, or any other measure of network performance. Security overlays may show what firewalls are in place, what infections have been detected, whether a denial of service attack has been detected, etc. Policies overlays could include any policy of the network that is applied to components of the network, for example, bandwidth utilization limits, times in which the network will run certain applications, etc. Various other overlays may provide data that allows a user to monitor a problem or track down the cause or effect of a problem. The action/configurations menu allows a user to select actions that affect the network at various layers.

Figure 13:
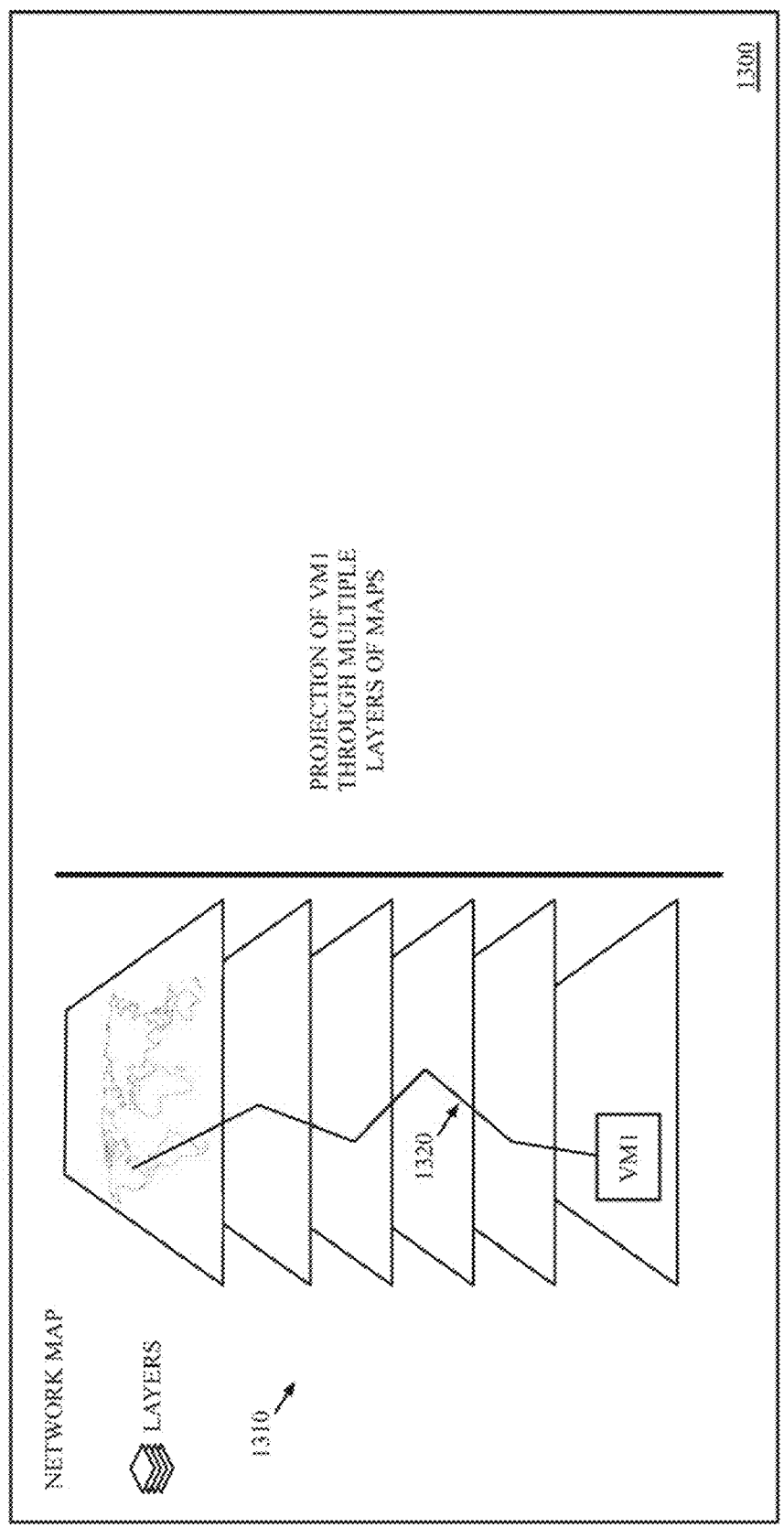
FIG. 13 conceptually illustrates zooming in through multiple layers of the network map.

FIG. 13 conceptually illustrates zooming in through multiple layers of the network map. The figure includes various layers 1310 and a conceptual path 1320 through those layers that a user follows in the GUI by selecting network objects at each layer. The path starts at a geographic layer (e.g., with the selection of a datacenter) and passes down through each layer to a virtual machine in that originally selected datacenter, displayed at the lowest layer of the hierarchy.

Figure 14:
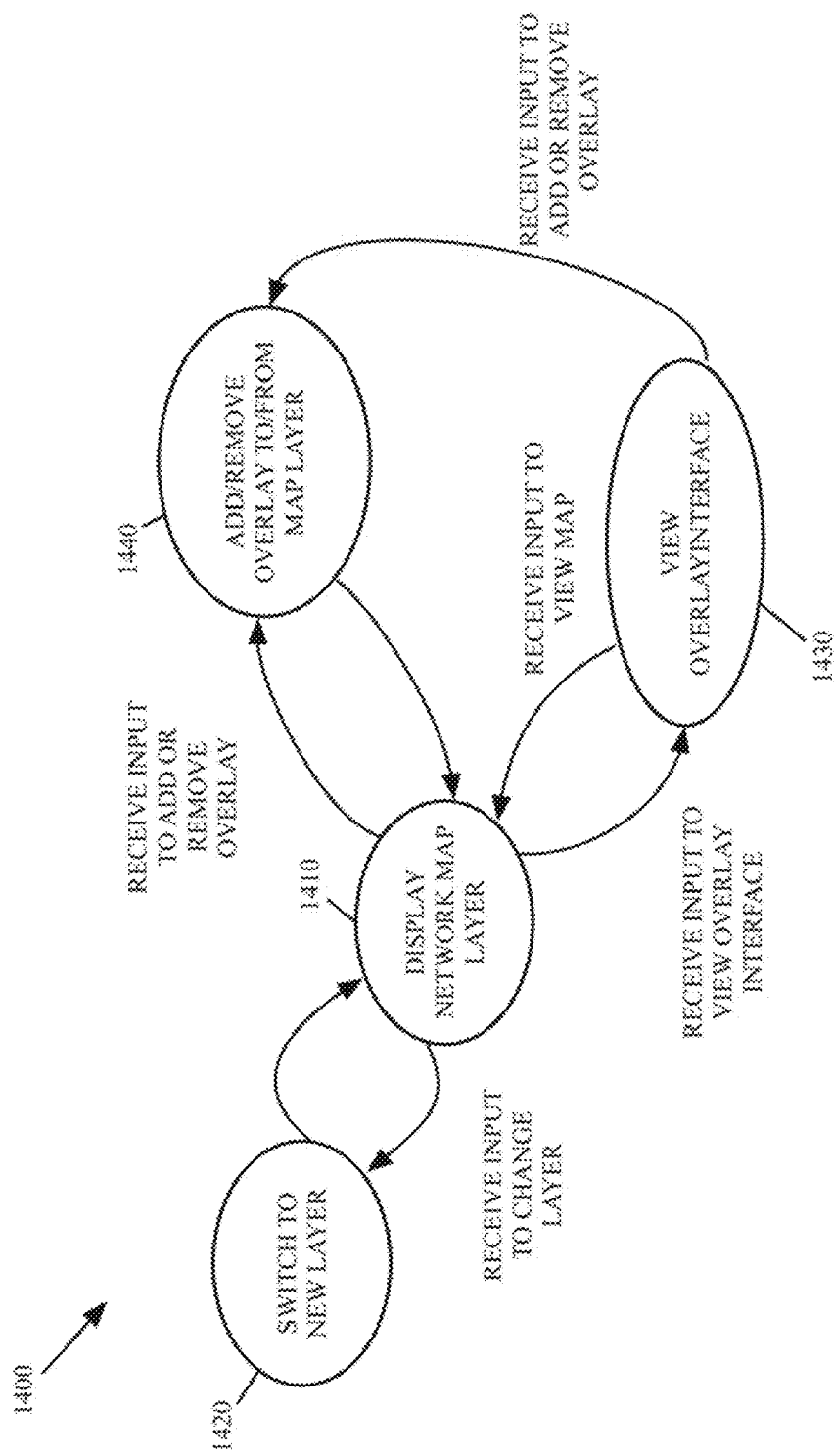
FIG. 14 conceptually illustrates a state diagram with example operations of the GUI to display network map layers and overlays.

FIG. 14 conceptually illustrates a state diagram with example operations of the GUI to display network map layers and overlays. This figure shows four states 1410-1440 that collectively perform these GUI operations. Each of the states represents a set of one or more processes for performing a subset of the GUI operations. The four states include a display network map layer state 1410, a switch to new layer state 1420, and a view overlay interface 1430. FIG. 14 will be described by reference to FIGS. 4-5 and 8, which show a GUI displaying two layers of a network map, FIG. 11, which shows the GUI displaying a layer with an overlay, and FIG. 12, which shows an overlay menu.

In state 1410, the GUI displays a network map layer (e.g., the geographical layer 400 of FIG. 4 or the orchestration layer 500 of FIG. 5). The GUI may receive various inputs in this state, such as an input commanding a change of layer, an input commanding a switch to viewing the overlay menu, or an input to add or remove an overlay (without using the overlay menu). The input commanding a change of layer causes the GUI to enter state 1420, in which the GUI switches to the new layer, then returns to state 1410, but with the new layer displayed. One example of this state transition is if the GUI is displaying the geographical layer 401 shown in FIG. 4, when a user selects a particular datacenter, then the GUI switches to the orchestration layer 500 shown in FIG. 5 and displays that layer.

An input commanding to display the overlay menu causes the GUI to transition from state 1410 to state 1430 (e.g., showing overlay selection screen 1200 of FIG. 12). From state 1430, the GUI may receive an input to view a map layer, in which case the GUI returns to state 1410 without adding an overlay. Alternately, the GUI may receive an input in state 1430 to add or remove an overlay in which case the GUI transitions to state 1440 in which it adds or removes the selected overlay and returns to state 1410. In addition, when the GUI is in state 1410, input to directly add or remove an overlay (without using the overlay menu) may be received. When this input is received, the GUI transitions to state 1440 directly from state 1410, adds or removes the overlay in state 1440, then returns to state 1410. For example, the GUI could be in state 1410 while showing the data plane layer 800 (of FIG. 8), then receive an input to add a policy overlay, transition to state 1440 to add the policy overlay, then transition to state 1410 to display the network map layer 800 with an overlay 1100 (as shown in FIG. 11).

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 15:
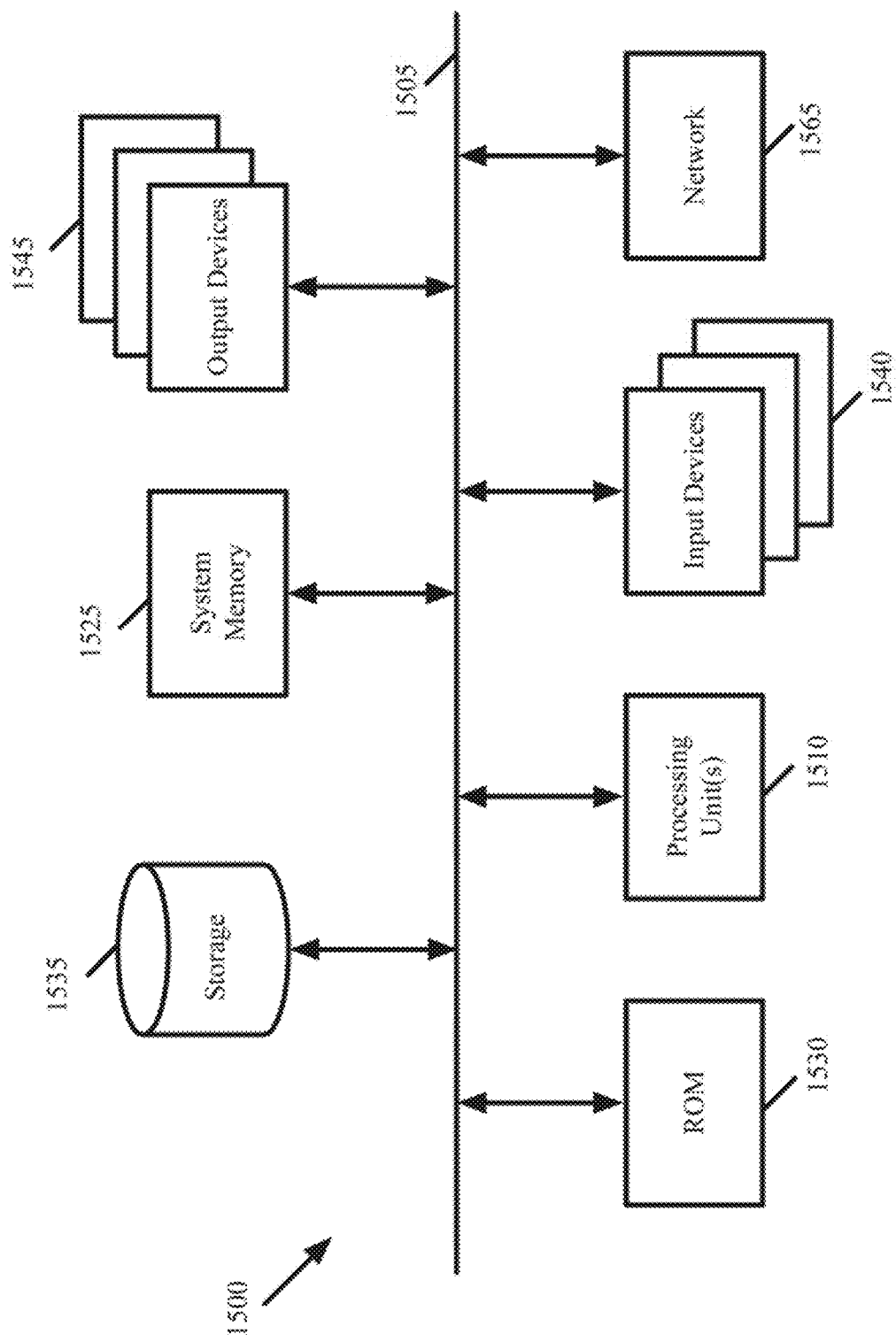
FIG. 15 conceptually illustrates an electronic system with which some embodiments of the invention are implemented.

FIG. 15 conceptually illustrates an electronic system 1500 with which some embodiments of the invention are implemented. The electronic system 1500 can be used to execute any of the applications described above, such as the network visualization application. The electronic system 1500 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 1500 includes a bus 1505, processing unit(s) 1510, a system memory 1525, a read-only memory 1530, a permanent storage device 1535, input devices 1540, and output devices 1545.

The bus 1505 collectively represents all system, peripheral, and chipset buses that communicatively connect the numerous internal devices of the electronic system 1500. For instance, the bus 1505 communicatively connects the processing unit(s) 1510 with the read-only memory 1530, the system memory 1525, and the permanent storage device 1535.

From these various memory units, the processing unit(s) 1510 retrieve instructions to execute and data to process in order to execute the processes of the invention. The processing unit(s) may be a single processor or a multi-core processor in different embodiments.

The read-only-memory (ROM) 1530 stores static data and instructions that are needed by the processing unit(s) 1510 and other modules of the electronic system. The permanent storage device 1535, on the other hand, is a read-and-write memory device. This device is a non-volatile memory unit that stores instructions and data even when the electronic system 1500 is off. Some embodiments of the invention use a mass-storage device (such as a magnetic or optical disk and its corresponding disk drive) as the permanent storage device 1535.

Other embodiments use a removable storage device (such as a floppy disk, flash drive, etc.) as the permanent storage device. Like the permanent storage device 1535, the system memory 1525 is a read-and-write memory device. However, unlike storage device 1535, the system memory is a volatile read-and-write memory, such as random access memory. The system memory stores some of the instructions and data that the processor needs at runtime. In some embodiments, the invention's processes are stored in the system memory 1525, the permanent storage device 1535, and/or the read-only memory 1530. From these various memory units, the processing unit(s) 1510 retrieve instructions to execute and data to process in order to execute the processes of some embodiments.

The bus 1505 also connects to the input and output devices 1540 and 1545. The input devices enable the user to communicate information and select commands to the electronic system. The input devices 1540 include alphanumeric keyboards and pointing devices (also called "cursor control devices"). The output devices 1545 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 15, bus 1505 also couples electronic system 1500 to a network 1565 through a network adapter (not shown). In this manner, the computer can be a part of a network of computers (such as a local area network ("LAN"), a wide area network ("WAN"), or an Intranet, or a network of networks, such as the Internet. Any or all components of electronic system 1500 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

This specification refers throughout to computational and network environments that include virtual machines (VMs). However, virtual machines are merely one example of data compute nodes (DCNs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses name spaces to isolate the containers from each other and therefore provides operating-system level segregation of the different groups of applications that operate within different containers. This segregation is akin to the VM segregation that is offered in hypervisor-virtualized environments that virtualize system hardware, and thus can be viewed as a form of virtualization that isolates different groups of applications that operate in different containers. Such containers are more lightweight than VMs.

Hypervisor kernel network interface modules, in some embodiments, is a non-VM DCN that includes a network stack with a hypervisor kernel network interface and receive/transmit threads. One example of a hypervisor kernel network interface module is the vmknic module that is part of the ESXi™ hypervisor of VMware, Inc.

It should be understood that while the specification refers to VMs, the examples given could be any type of DCNs, including physical hosts, VMs, non-VM containers, and hypervisor kernel network interface modules. In fact, the example networks could include combinations of different types of DCNs in some embodiments.

While the invention has been described with reference to numerous specific details, one of ordinary skill in the art will recognize that the invention can be embodied in other specific forms without departing from the spirit of the invention. In addition, a number of the figures (including FIG. 3) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

What is claimed is:

1. A method for generating a multi-layer network map from network configuration data, the method comprising:
receiving network configuration data that defines network components and connections between the network components for a network that spans one or more datacenters;
based on the received network configuration data, generating a plurality of network data layers for a multi-layer interactive map of the network; and
generating a visual representation of the network for each network data layer, each visual representation comprising a map of the network at a different level of hierarchy, wherein generating the visual representation of the network comprises:
generating a visual representation of a first network data layer with a plurality of logical network components and a set of logical connections between the logical network components,
generating a visual representation of a second network data layer with a plurality of physical network components that implement the logical network components, and
generating a visual representation of a third network data layer with the plurality of physical network components that implement the logical network components, additional physical network components, and connections between the physical network components.

2. The method of claim 1 further comprising generating a set of overlays for each network data layer, each overlay comprising an additional visual depiction of an aspect of the network.

3. The method of claim 2, wherein each overlay comprises at least one of a runtime aspect of the network and a configuration aspect of the network.

4. The method of claim 2, wherein at least one overlay for the first network data layer identifies an application of a policy specified by the network configuration data to a set of logical network components.

5. The method of claim 2, wherein at least one overlay visually identifies a current value of a network performance metric for a set of network components or connections.

6. The method of claim 1, wherein the first network data layer comprises a first set of links from the first network data layer to the second network data layer and the second network data layer comprises a second set of links from the second network data layer to the third network data layer.

7. The method of claim 6 further comprising:
generating a first link from the first network data layer to the second network data layer by associating one or more logical network components of the first network data layer with the first link to the second network data layer; and
generating a second link from the second network data layer to the third network data layer by associating one or more physical network components of the second network data layer with the second link to the third network data layer.

8. The method of claim 7, wherein generating the visual representation of the first network data layer further comprises generating selectable items for the one or more network components that link to the visual representation of the second network data layer.

9. The method of claim 1, wherein a particular logical network component is represented in the visual representation of the first network data layer and not in the visual representations of the second or third network data layers, wherein a particular physical network component is represented in the visual representation of the second and third network data layers and not in the first network data layer.

10. The method of claim 1, wherein a particular logical network component is represented in the visual representations of both the first and second network data layers.

11. The method of claim 1, wherein the network configuration data defines a logical network that is physically implemented in the one or more datacenters.

12. The method of claim 11, wherein generating the visual representation of the network further comprises generating a fourth network data layer with the plurality of datacenters and connections between the datacenters.

13. A non-transitory machine readable medium storing a program which when executed by one or more processing units generates a multi-layer network map from network configuration data, the program comprising sets of instructions for:
receiving network configuration data that defines network components and connections between the network components for a network that spans one or more datacenters;
based on the received network configuration data, generating a plurality of network data layers for a multi-layer interactive map of the network, wherein different data layers include different network components and connections;
generating a visual representation of the network for each network data layer, each visual representation comprising a map of the network at a different level of hierarchy, wherein a first network data layer that is higher in the hierarchy than a second network data layer comprises a particular network component that represents at least two network components in the second network data layer.

14. The non-transitory machine readable medium of claim 13, wherein the program further comprises sets of instructions for generating a set of overlays for each network data layer, each overlay comprising an additional visual depiction of an aspect of the network.

15. The non-transitory machine readable medium of claim 14, wherein each overlay comprises at least one of a runtime aspect of the network and a configuration aspect of the network.

16. The non-transitory machine readable medium of claim 14, wherein at least one overlay identifies an application of a policy specified by the network configuration data to a set of network components or connections.

17. The non-transitory machine readable medium of claim 14, wherein at least one overlay visually identifies a current value of a network performance metric for a set of network components or connections.

18. The non-transitory machine readable medium of claim 13, wherein the first network data layer comprises a set of links from the first network data layer to the second network data layer.

19. The method of claim 18, wherein the program further comprises a set of instructions for generating a link from the first network data layer to the second network data layer by associating one or more network components of the first network data layer with the link to the second network data layer.

20. The non-transitory machine readable medium of claim 19, wherein generating the visual representation of the first network data layer comprises generating selectable items for the one or more network components that link to the visual representation of the second network data layer, wherein at least one selectable item for a network component in the first network data layer represents a logical forwarding element that links to two or more physical forwarding elements in the second network data layer that implement the first logical forwarding element.

\* \* \* \* \*